United States Patent
Wang et al.

(10) Patent No.: US 9,649,618 B2
(45) Date of Patent: May 16, 2017

(54) METHOD FOR PREPARING SOLID AMINE GAS ADSORPTION MATERIAL

(71) Applicants: Shenhua Group Corporation Limited, Dongcheng District, Beijing (CN); National Institute of Clean-and-Low-Carbon Energy, Changping District, Beijing (CN)

(72) Inventors: Baodong Wang, Beijing (CN); Zhonghua Zhang, Beijing (CN); Qi Sun, Beijing (CN)

(73) Assignees: National Institute of Clean-and-Low-Carbon Energy, Beijing (CN); Shenhua Group Connection Limited, Beijing (CN)

( * ) Notice: Subject to any disclaimer, the term of this patent is extended or adjusted under 35 U.S.C. 154(b) by 2 days.

(21) Appl. No.: 14/647,743

(22) PCT Filed: Nov. 27, 2012

(86) PCT No.: PCT/CN2012/085356
§ 371 (c)(1),
(2) Date: May 27, 2015

(87) PCT Pub. No.: WO2014/082206
PCT Pub. Date: Jun. 5, 2014

(65) Prior Publication Data
US 2015/0321167 A1    Nov. 12, 2015

(51) Int. Cl.
B01J 20/26 (2006.01)
B01J 20/10 (2006.01)
C01B 33/154 (2006.01)
B01J 20/291 (2006.01)
B01J 20/30 (2006.01)
B01J 20/22 (2006.01)
B01D 53/02 (2006.01)
B01J 20/28 (2006.01)

(52) U.S. Cl.
CPC ............ B01J 20/103 (2013.01); B01D 53/02 (2013.01); B01J 20/22 (2013.01); B01J 20/261 (2013.01); B01J 20/28047 (2013.01); B01J 20/291 (2013.01); B01J 20/3085 (2013.01); C01B 33/1546 (2013.01); B01D 2252/20415 (2013.01); B01D 2253/106 (2013.01); B01D 2253/20 (2013.01); B01D 2253/25 (2013.01); B01D 2257/302 (2013.01); B01D 2257/304 (2013.01); B01D 2257/404 (2013.01); B01D 2257/504 (2013.01); B01J 2220/4887 (2013.01); Y02C 10/08 (2013.01); Y02P 20/152 (2015.11)

(58) Field of Classification Search
CPC .................................. B01J 20/26; B01J 20/32
USPC .......................................................... 502/402
See application file for complete search history.

(56) References Cited

U.S. PATENT DOCUMENTS

| 7,871,583 B2 | 1/2011 | Jinguo et al. |
| 8,377,173 B2 | 2/2013 | Chuang |

FOREIGN PATENT DOCUMENTS

| CN | 101049935 A | 10/2007 |
| CN | 101704525 A | 5/2010 |
| CN | 101804332 A | 8/2010 |
| CN | 101909743 A | 12/2010 |

OTHER PUBLICATIONS

Fisher, II, J.C., et al., "Oxide-Supported Tetraethylenepentamine for CO2 Capture," 2009, Environmental Progress & Sustainable Energy, 28(4):589-598 (Abstract Only).
Gray, M.L., et al., "CO2 Capture by Amine-Enriched Fly Ash Carbon Sorbents," 2004, Separation and Purification Technology, 35(1):31-36.
Shi, Q., et al., "Preparation of Active SiO2 from Fly Ash," Chemical Engineering (CN), 2010, 38/11:86-89 (Abstract Only).
Shi, Q., et al., "Preparation of Active SiO2 from Fly Ash," Chemical Engineering (China), 2010, pp. 86-89, vol. 38, No. 11 (English Abstract).

*Primary Examiner* — Edward Johnson
(74) *Attorney, Agent, or Firm* — Senniger Powers LLP

(57) ABSTRACT

The present invention relates to a method for preparing a solid amine gas adsorption material. The method synthesizes a porous solid amine gas adsorption material that loads organic amine evenly. In the method, a certain amount of acidic gas is introduced while organic amine molecules are introduced into a silicate solution as template agents, which not only makes sizes of $SiO_2$ pore channels homogeneous, but also makes organic amine molecules highly evenly distributed on a surface of $SiO_2$. In addition, the acidic gas protects $—NH_2$ groups of organic amine, and avoids $—NH_2$ adhesion inactivation due to hydrogen bonding during the synthesis process of the material. The present invention also relates to a method for preparing a solid amine gas adsorption material after obtaining a silicate solution from fly ash. The solid amine gas adsorption material prepared has more stable and effective gas adsorption performance.

13 Claims, 2 Drawing Sheets

_US 9,649,618 B2_

METHOD FOR PREPARING SOLID AMINE GAS ADSORPTION MATERIAL

REFERENCE TO CORRESPONDING APPLICATIONS

This application is the 371 National Stage Application based on International PCT Application No. PCT/CN2012/085356, filed Nov. 27, 2012.

FIELD OF THE INVENTION

This invention belongs to the field of absorption material preparation, to be specific, it relates to a method for preparing a solid amine gas adsorption material, adsorption material prepared by said method and use thereof. This invention also relates to a method for preparing a solid amine gas adsorption material with fly ash.

BACKGROUND ART

One disadvantage of industrial development and urbanization is discharge of exhaust gas. The exhaust gas discharged usually comprises toxic gases such as sulphur oxides and nitrogen oxides ($SO_X$ and $NO_X$), as well as carbon oxides such as carbon dioxide. The above discharged exhaust gas are acidic gases.

The above acidic gases are adsorbed by solid adsorption materials. Solid amine adsorption material, especially, has become a research focus. These solid adsorption materials that load amine functional groups per se are porous adsorption materials. Amine functional groups at the terminal of amine molecules can effectively capture acidic gases. Thus when said adsorption materials contact the gas needed to be adsorbed, the synergism of physical adsorption and chemical adsorption greatly improve the adsorption efficiency.

Among the existing technologies, the way in which amine and support are bound mainly includes impregnation and chemical bond grafting. The impregnation preparation process is simple, and high content amine is easily obtained, resulting in high absorbing ability. However, amine is not tightly bound to the support, which may suffer loss due to volatilization at higher temperatures. As to the absorbent prepared by chemical bond grafting, the amine group is linked to the support via chemical bonds, and the absorbent has a high stability. However, the preparation process of chemical bond grafting is complicated, the grafting amount of the amine group is relatively low, and the absorbing ability is poorer than that of the absorbent prepared by impregnation.

In terms of solid support selection, several researchers have conducted experiment on porous supports, such as silica, alumina, molecular sieve, activated carbon. In terms of organic amine selection, MEA, PEI, DEA, TEPA, and the like are mainly chosen.

In the course of preparing solid amine adsorption materials, organic amine with suitable molecular size shall be matched with pore diameter and specific surface of the suitable solid support, so that organic amine molecules can enter the inside of pore channels as far as possible to be evenly loaded on the surface of the solid support.

M. L. Gray employed the impregnation method to synthesize a solid amine adsorption material by utilizing fly ash as support to load CPAHCL, the maximum adsorbing ability thereof was 1 wt % only ($CO_2$ capture by amine-enriched fly ash carbon sorbents, M. L. Gray, Y. Soong, K. J. Champagne, John Baltrus, R. W. Stevens, Jr, P. Toochinda, S. S. C. Chuang, Separation and Purification Technology 35 (2004) 31-36). Steven Chuang employed the impregnation method to synthesize a solid amine adsorption material by utilizing Beta-molecular sieve to load TEPA, and the maximum adsorbing ability thereof was 9.13 wt % (Oxide-Supported Tetraethylenepentamine for $CO_2$ Capture, James C. Fisher II, Jak Tanthana, and Steven S. C. Chuang, Environmental Progress & Sustainable Energy (Vol. 28, No. 4)).

The solid adsorption materials introduced by the above documents did not have an ideal adsorption effect, the highest carbon dioxide adsorption rate thereof was about 10 wt %. It is possible that in actual situation, compared to the theoretical value, organic amine is not evenly distributed, amine functional groups at the terminal of amine molecules fail to form effective carbon dioxide capture sites on the solid surface and the inside of pore channels homogeneously; or the interaction between amine functional groups at dendrimers and active sites on the surface of the solid support impacts the effective capture of carbon dioxide molecules.

In order to solve the problems existing in the prior art, i.e. a complicated process for preparing a solid amine gas adsorption material, necessity of special equipment or high costs, and poor selectivity, stability and adsorption capacity of the existing solid amine gas adsorption material, the inventors provided a novel method for preparing a solid amine gas adsorption material as well as the solid amine gas adsorption material prepared by the method and use thereof.

SUMMARY OF THE INVENTION

This invention relates to a method for preparing a solid amine gas adsorption material, which synthesizes in one step a porous solid amine gas adsorption material that loads organic amine evenly.

In said method, a certain amount of acidic gas is introduced while organic amine molecules are introduced into a silicate solution as template agents, which not only makes sizes of $SiO_2$ pore channels homogeneous, but also makes organic amine molecules highly evenly distributed on a surface of $SiO_2$. In addition, the acidic gas protects —$NH_2$ groups of organic amine, and avoids —$NH_2$ adhesion inactivation due to hydrogen bonding during the synthesis process of the material.

According to one aspect of this invention, provided is a method for preparing a solid amine gas adsorption material, comprising steps of:

1) adding organic amine to a silicate solution, slowly introducing acidic gas to the solution while stirring, until the pH value of the solution becomes 9-11, so as to obtain a $SiO_2$ sol or gel;

2) filtering off the $SiO_2$ sol or gel precipitate from the above solution, aging, drying and dehydrating, to obtain a solid amine gas adsorption material.

According to one aspect of this invention, the concentration of the silicate solution is 5 to 50% by weight.

The silicate solution in the above step (1) can be any soluble silicate solution known in the art, preferably, a sodium silicate solution and/or potassium silicate solution.

The silicate solution of this invention can be obtained from a silica-containing material. According to another aspect of this invention, such silica-containing material is fly ash.

That is, another aspect of this invention provides a method for preparing a solid amine gas adsorption material with fly ash, comprising steps of:

1) subjecting fly ash and an alkali solution to alkali fusion, filtering after the reaction to obtain a silicate-containing supernatant;

2) adding organic amine to the above supernatant, slowly introducing acidic gas to the solution while stirring, until the pH value of the solution becomes 9-11, so as to obtain a $SiO_2$ sol or gel;

3) filtering off the $SiO_2$ sol or gel precipitate from the above solution, aging, drying and dehydrating, to obtain a solid amine gas adsorption material.

Preferably, in the above step 1), fly ash and 10-30 wt % alkali solution are subjected to alkali fusion according to a solid-liquid weight ratio of 1:1 to 1:5 at a temperature between 30 and 120° C. to react for 30 to 120 min, and then filtered to obtain the silicate-containing supernatant.

Preferably, step (1) of the above preparation method is carried out at a temperature between 80 and 100° C.

In the preparation method of this invention, said acidic gas may be selected from carbon oxides, sulphur oxides, nitrogen oxides and sulphur hydrides. Said acidic gas may be selected from one or more of a group consisting of carbon dioxide, sulphur oxides, nitrogen oxides and sulphur hydrides; preferably, it may be selected from carbon dioxide and/or hydrogen sulfide. In consideration of acquisition cost, carbon dioxide is preferred.

In the above method, said alkali solution may be any strong alkali solution, selected from one or more of a group consisting of amino compounds, alkali hydrides and hydroxides, preferably sodium hydroxide and/or potassium hydroxide.

In the aforementioned preparation process, preferably, said organic amine may be selected from one or more of a group consisting of polyethyleneimine (PEI), tetraethylenepentamine (TEPA), ethylenediamine, butanediamine, hexanediamine, tris(2-aminoethyl)amine, acrylonitrile, cyanuric chloride, diisopropylethylamine and methyl acrylate. More preferably, said organic amine is polyethyleneimine (PEI) and/or tetraethylenepentamine (TEPA).

Preferably, wherein, based on a ratio between the mass of the organic amine and the mass of the finally prepared solid amine gas adsorption material (sic passim), the organic amine load of the adsorption material is from 10 to 60%, more preferably from 30 to 45%.

In the above method, preferably, the flow rate of said acidic gas is 5 to 15 L/min; preferably, aging, drying and dehydrating are performed at a temperature between 100 and 120° C.

According to a third aspect of this invention, provided is a solid amine gas adsorption material, which is prepared according to the above method. Preferably, the organic amine load of said adsorption material is from 10 to 60% by weight, preferably, from 30 to 45% by weight. More preferably, organic amine loaded on said adsorption material is polyethyleneimine (PEI) and/or tetraethylenepentamine (TEPA).

The adsorption material of this invention is used for adsorbing carbon oxides, sulphur oxides, nitrogen oxides and sulphur hydrides. Said acidic gas may be selected from one or more of a group consisting of carbon dioxide, sulphur oxides, nitrogen oxides and sulphur hydrides, preferably, from carbon dioxide and/or hydrogen sulfide.

Compared with the prior art, this invention has the following advantages:

1. The method of this invention synthesizes in one step a porous solid support with a high specific surface area that loads organic amine, as the solid amine gas adsorption material, which is simple in process.

2. In the method of this invention, acidic gas (such as $CO_2$ or $NO_2$) is introduced while amine molecules are introduced into a solution as template agents, which not only makes sizes of $SiO_2$ pore channels homogeneous during the formation of sol gel precipitate by $SiO_2$, but also makes organic amine molecules highly evenly distributed on a surface of $SiO_2$. In addition, $CO_2$ reacts with —$NH_2$ of organic amine for protection, so as to avoid —$NH_2$ adhesion inactivation due to hydrogen bonding during the synthesis process of the material.

3. Fly ash is used as raw material for the silicate solution in the method of this invention, which, as a byproduct from the process of extracting aluminum from fly ash, is low in costs, belonging to comprehensive use of wastes.

4. Organic amine in the solid amine gas adsorption material prepared by the method of this invention is loaded on the surface of the solid support and the inside of pore channels and/or is bound with the active site, for improving the structure and characteristics of the solid support surface and the pore channels, increasing amine moiety, concentration and/or activity for capturing gases, so as to improve speed, ability and/or properties of the adsorption material for adsorbing or capturing gases. Thus, said adsorption material with high stability and selectivity, not only increases the adsorption amount of the adsorbed gas, but also accelerates the adsorption rate, thereby rendering the adsorption material more stable and more effective adsorbing performance.

SPECIFIC EMBODIMENTS

Figure 1:
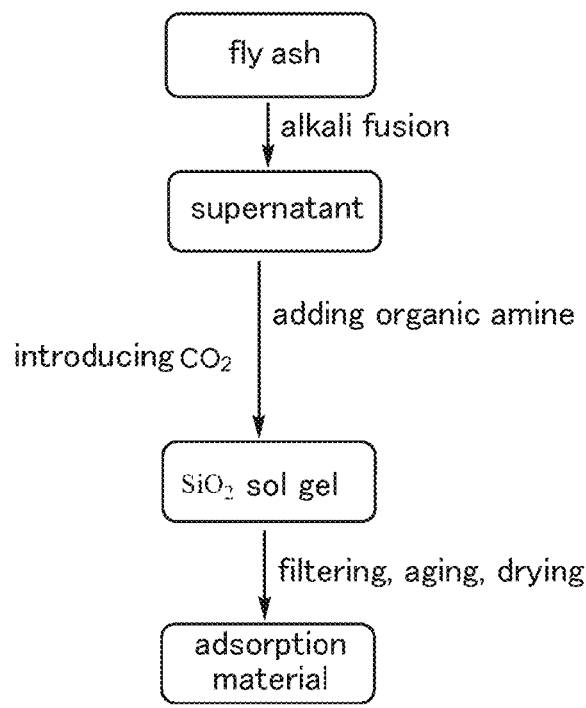
FIG. 1 shows a synthesis process diagram of preparing a solid amine gas adsorption material with fly ash according to this invention.

This invention is further illustrated hereinbelow, however, the following examples are merely described to assist a person skilled in the art to better understand principles and essences of this invention, instead of setting any limitation on this invention.

The properties and preparation method of the above adsorption material are illustrated hereinbelow by exemplary, rather than restrictive examples.

EXAMPLES

Example 1

Preparation of PEI(30%)-$SiO_2$ Solid Amine Gas Adsorption Material

Step (1): Preparing a Supernatant by Desiliconization of Fly Ash

The fly ash used in this Example was obtained from some power plant of Shenhua Zhungeer, and the chemical components thereof were shown in Table 1.

TABLE 1

| | Composition | | | | | | | |
|---|---|---|---|---|---|---|---|---|
| | $SiO_2$ | $Al_2O_3$ | CaO | $Fe_2O_3$ | MgO | $K_2O$ | $TiO_2$ | Other |
| wt % | 39.15 | 52.41 | 1.02 | 2.16 | 0.32 | 0.42 | 1.31 | 3.21 |

40 g of the above fly ash were dissolved in a 400 ml solution containing 15% by weight of sodium hydroxide at 90° C., to react for 90 min, and filtered to obtain a supernatant containing 6.72% by weight of $Na_2SiO_3$. Since $K_2O$ was contained in lattice, and thus could not be dissolved during the reaction, so that the solute in the supernatant was basically sodium silicate.

Step (2): Loading Organic Amine 2.4 g polyethyleneimine (PEI) in a purity of 98% by weight were added to a 100 ml supernatant prepared in Step (1), carbon dioxide gas in a purity of 99% was introduced therein at a flow rate of 10 L/min while stirring. White flocculent $SiO_2$ sol precipitate appeared when the pH of the solution was about 13. The introduction of $CO_2$ continued until the pH was 10.

Step (3): Aging and Drying

The $SiO_2$ sol precipitate was filtered and subjected to aging, drying and dehydrating at 110° C. to prepare a solid amine gas adsorption material PEI(30%)-$SiO_2$. The ratio of the mass of the added organic amine to the total mass of the finally obtained solid amine gas adsorption material was about 30% (see Test example 1). The specific surface area of the adsorption material was 9.85 m²/g, the pore volume was 0.05 cm³/g, and the pore diameter was 11.02 nm.

Example 2

Preparation of PEI(45%)-$SiO_2$ Solid Amine Gas Adsorption Material

Step (1): Preparing a Supernatant by Desiliconization of Fly Ash

The fly ash used in this Example was obtained from some power plant of Shenhua Zhungeer, and the chemical components thereof were shown in Table 1.

TABLE 1

| | Composition | | | | | | | |
|---|---|---|---|---|---|---|---|---|
| | $SiO_2$ | $Al_2O_3$ | CaO | $Fe_2O_3$ | MgO | $K_2O$ | $TiO_2$ | Other |
| wt % | 39.15 | 52.41 | 1.02 | 2.16 | 0.32 | 0.42 | 1.31 | 3.21 |

100 g of the above fly ash were dissolved in a 400 ml solution containing 15% by weight of sodium hydroxide at 90° C., to react for 90 min, and were filtered to obtain a supernatant containing 16.8% by weight of $Na_2SiO_3$. Since $K_2O$ was contained in lattice, and thus could not be dissolved during the reaction, so that the solute in the supernatant was basically sodium silicate.

Step (2): Loading Organic Amine 9 g polyethyleneimine (PEI) in a purity of 98% were added to 100 ml supernatant prepared in Step (1), carbon dioxide gas in a purity of 99% was introduced therein at a flow rate of 10 L/min while stirring. White flocculent $SiO_2$ sol precipitate appeared when the pH of the solution was about 13. The introduction of $CO_2$ continued until the pH was 10.

Step (3): Aging and Drying

The $SiO_2$ sol precipitate was filtered and subjected to aging, drying and dehydrating at 112° C. to prepare a solid amine gas adsorption material PEI(45%)-$SiO_2$. The ratio of the mass of the added organic amine to the total mass of the finally obtained solid amine gas adsorption material was about 45% (see Test example 1). The specific surface area of the adsorption material was 15.03 m²/g, the pore volume was 0.07 cm³/g, and the pore diameter was 17.78 nm.

Example 3

Preparation of TEPA(30%)-$SiO_2$ Adsorption Material

Step (1): Preparing a Supernatant by Desiliconization of Fly Ash

The fly ash used in this Example was obtained from some power plant of Shenhua Zhungeer, and the chemical components thereof were shown in Table 1.

TABLE 1

| | Composition | | | | | | | |
|---|---|---|---|---|---|---|---|---|
| | $SiO_2$ | $Al_2O_3$ | CaO | $Fe_2O_3$ | MgO | $K_2O$ | $TiO_2$ | Other |
| wt % | 39.15 | 52.41 | 1.02 | 2.16 | 0.32 | 0.42 | 1.31 | 3.21 |

200 g of the above fly ash were dissolved in a 400 ml sodium containing 15% by weight of sodium hydroxide at 90° C., to react for 90 min, and were filtered to obtain a supernatant containing 33.6% by weight of $Na_2SiO_3$. Since $K_2O$ was contained in lattice, and thus could not be dissolved during the reaction, so that the solute in the supernatant was basically sodium silicate.

Step (2): Loading Organic Amine 12 g tetraethylenepentamine (TEPA) in a purity of 98% were added to 100 ml supernatant prepared in Step (2), carbon dioxide gas in a purity of 99% was introduced therein at a flow rate of 10 L/min while stirring. White flocculent $SiO_2$ sol precipitate appeared when the pH of the solution was about 13. The introduction of $CO_2$ continued until the pH was 9.

Step (3): Aging and Drying

The $SiO_2$ sol precipitate was filtered and subjected to aging, drying and dehydrating at 110° C. to prepare a solid amine gas adsorption material TEPA(30%)-$SiO_2$. The ratio of the mass of the added organic amine to the total mass of the finally obtained solid amine gas adsorption material was 30% (see Test example 1). The specific surface area of the adsorption material was 8.71 m²/g, the pore volume was 0.03 cm³/g, and the pore diameter was 9.36 nm.

Test Example 1

A thermogravimetric analyzer was used to measure the organic amine load and the $CO_2$ adsorption amount of the adsorption material prepared in Examples 1-3 by heating. After performing the adsorption-desorption cyclic operation for 20 times, variation in the organic amine load and the $CO_2$ adsorption amount was observed, and test results thereof were shown in the following Table 3.

The organic amine load=the mass of the loaded organic amine/the total mass of the solid amine adsorption material;

$CO_2$ adsorption amount (mg/g adsorption material)=the mass of the adsorbed $CO_2$ (mg)/the total mass of the adsorption material (g).

TABLE 3

|  |  | First adsorption | | After 20 times of $CO_2$ adsorption-desorption | |
| --- | --- | --- | --- | --- | --- |
| Examples | Adsorption material | Organic amine load (wt %) | $CO_2$ adsorption amount (mg/g adsorption material) | Organic amine load (wt %) | $CO_2$ adsorption amount (mg/g adsorption material) |
| Example 1 | PEI(30%)-$SiO_2$ | 29.8 | 61 | 28.1 | 49 |
| Example 2 | PEI(45%)-$SiO_2$ | 45.2 | 122 | 43.2 | 99 |
| Example 3 | TEPA(30%)-$SiO_2$ | 29.6 | 54 | 27.6 | 46 |

Test Example 2

A thermogravimetric analyzer was used to measure, by heating, the organic amine load as well as the $CO_2$ adsorption amount of the solid amine gas adsorption material prepared according to the method of Example 2 of this invention, and the solid amine gas adsorption material synthesized according to the traditional impregnation method. The results were shown in FIG. 2.

The traditional impregnation method for synthesis of a solid amine gas adsorption material comprises: impregnating a silicon dioxide porous support in an ethanol solution of organic amine PEI, adsorbing or storing the ethanol solution of organic amine PEI in the support capillary, removing the redundant solution, drying, calcining, and activating.

Figure 2:
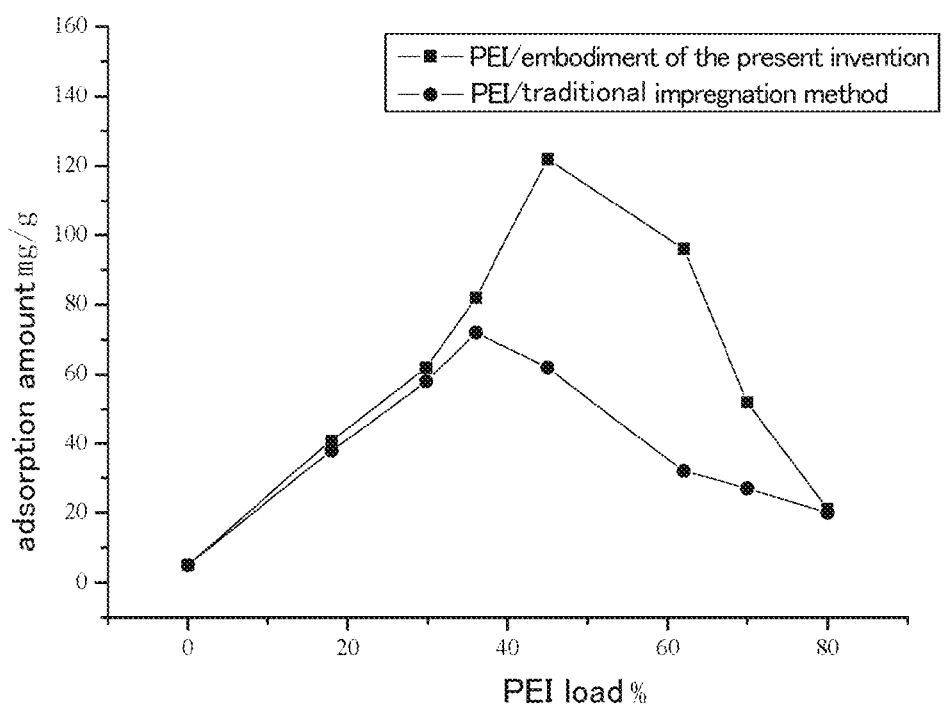
FIG. 2 shows a contrast diagram of adsorption properties between the solid amine gas adsorption material prepared in an example of this invention and the solid amine gas adsorption material prepared by the impregnation method.
Figure 3:
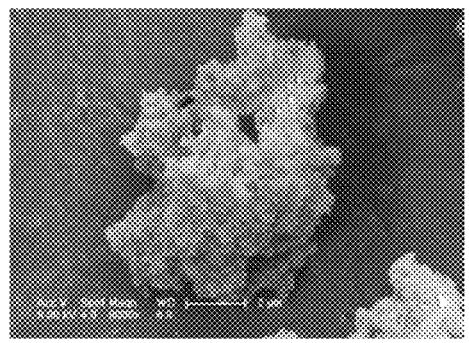
FIG. 3 is a scanning electron micrograph of PEI(45%)-$SiO_2$ prepared in Example 2, therefrom the porous and high specific surface area profile of the adsorbent can be observed, thus enhancing the adsorption property for $CO_2$.

As shown by FIG. 2, when the PEI load of the solid amine gas adsorption material synthesized by the traditional impregnation method was 35 wt %, the maximum $CO_2$ adsorption amount was 74 mg/g of the adsorption material. The solid amine gas adsorption material synthesized by the method of this invention enables organic amine to be dispersed more evenly on the $SiO_2$ support, when the PEI load thereof was 45 wt %, the maximum $CO_2$ adsorption amount could be up to 122 mg/g of the adsorption material.

The terms and expressions used in this description are descriptive, rather than restrictive terms and expressions, which, when being used, are not inclined to rule out any equivalent of the already indicated and described features or component parts.

Although several embodiments of this invention have been indicated and described, this invention shall not be limited to said described embodiments. On the contrary, the skilled artisan shall realize that any change or improvement can be made to these embodiments without deviating from the principles and essences of this invention. The protection scope of this invention is determined by the appended claims and equivalents thereof.

The invention claimed is:

1. A method for preparing a solid amine gas adsorption material, comprising the steps of:
  1) adding an organic amine to a silicate solution, introducing an acidic gas to the solution while stirring, until the pH value of the solution is 9 to 11, to obtain a $SiO_2$ sol or gel precipitate; and
  2) filtering off the $SiO_2$ sol or gel precipitate from the above solution, and aging, drying, and dehydrating, to obtain a solid amine gas adsorption material.

2. The method according to claim 1, wherein the silicate solution is a sodium silicate solution and/or a potassium silicate solution.

3. The method according to claim 1, wherein the concentration of the silicate solution is 5 to 50 wt %.

4. The method according to claim 1, wherein the silicate solution is prepared by filtering the reaction mixture obtained by subjecting fly ash and an alkali solution to alkali fusion.

5. The method according to claim 4, wherein the source of the alkali in the alkali solution is selected from one or more of a group consisting of amino compounds, alkali hydrides, and alkali hydroxides.

6. The method according to claim 4, wherein fly ash and a 10 to 30 wt % alkali solution are subjected to alkali fusion according to a solid-liquid weight ratio of 1:1 to 1:5.

7. The method according to claim 4, wherein the alkali fusion reaction lasts for 30 to 120 min.

8. The method according to claim 4, wherein the alkali fusion reaction is carried out at a temperature between 30 and 120° C.

9. The method according to claim 1, wherein said acidic gas is selected from one or more of a group consisting of carbon oxides, sulphur oxides, nitrogen oxides, and sulphur hydrides.

10. The method according to claim 1, wherein said organic amine is selected from the group consisting of polyethyleneimine (PEI), tetraethylenepentamine (TEPA), ethylenediamine, butanediamine, hexanediamine, tris(2-aminoethyl)amine, acrylonitrile, cyanuric chloride, diisopropylethylamine, methyl acrylate, and mixtures thereof.

11. The method according to claim 1, wherein the ratio between the mass of the organic amine and the mass of the obtained solid amine gas adsorption material is from 1:10 to 6:10.

12. The method according to claim 1, wherein the flow rate of said acidic gas is 5 to 15 L/min.

13. The method according to claim 1, wherein aging, drying, and dehydrating are performed at a temperature between 100 and 120° C.

* * * * *